July 24, 1951
H. T. ODQUIST ET AL
2,561,406
APPARATUS FOR INSPECTING ARTICLES WITH A MOVABLE
SPOT OF RADIANT ENERGY
Filed Feb. 4, 1949
5 Sheets-Sheet 1
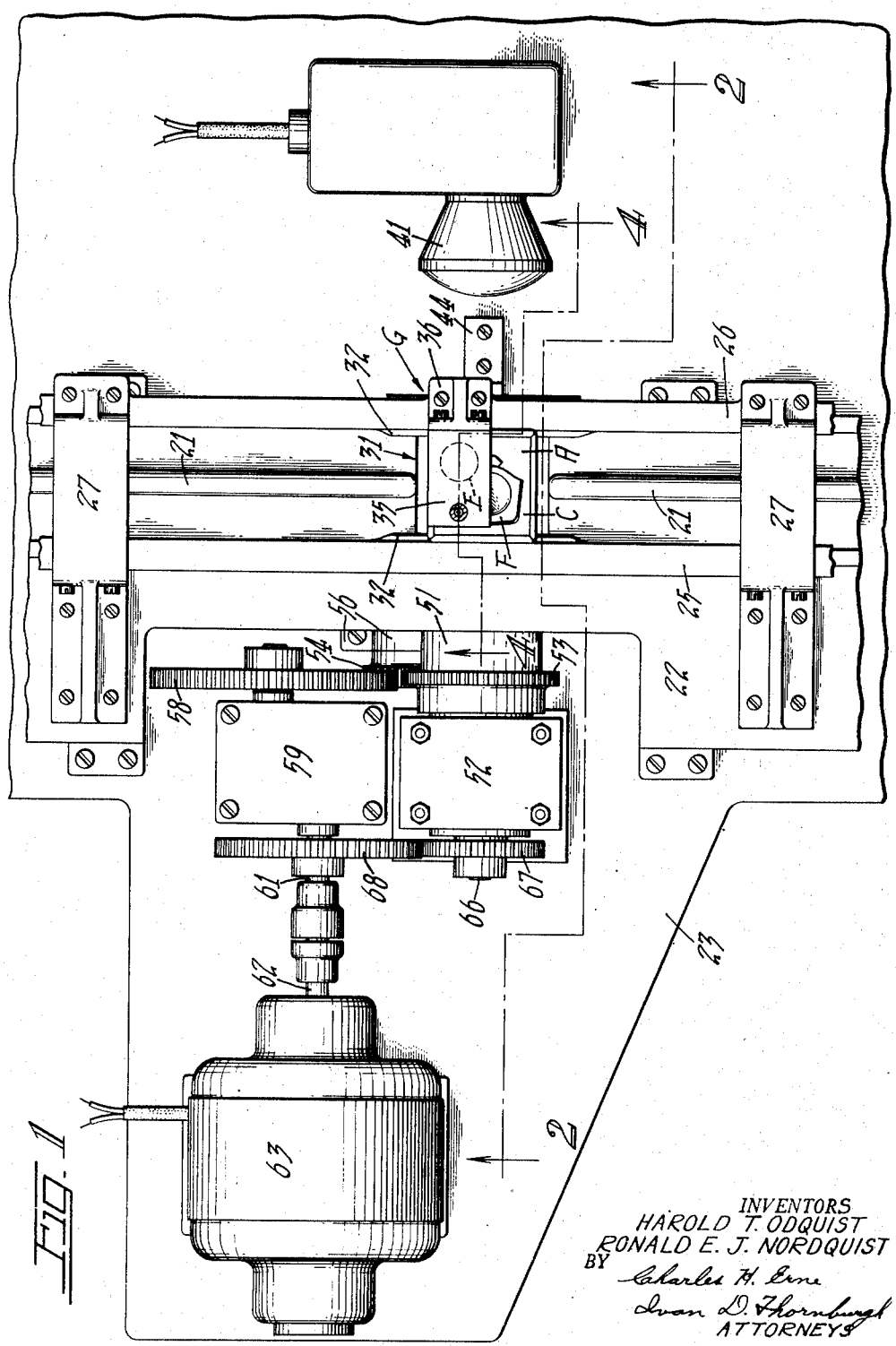
INVENTORS
HAROLD T. ODQUIST
RONALD E. J. NORDQUIST
BY
Charles H. Erne
Ivan D. Thornburgh
ATTORNEYS

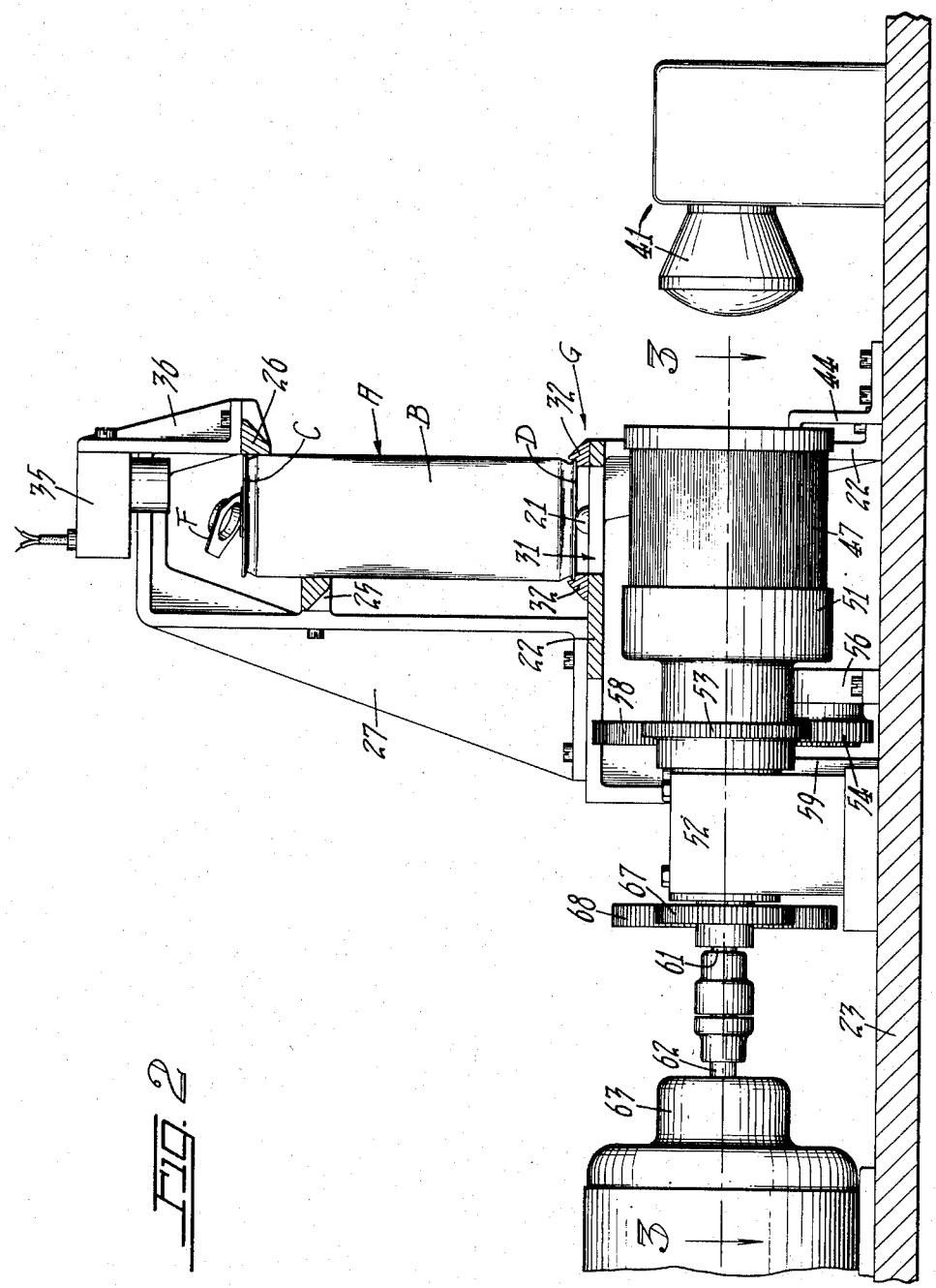

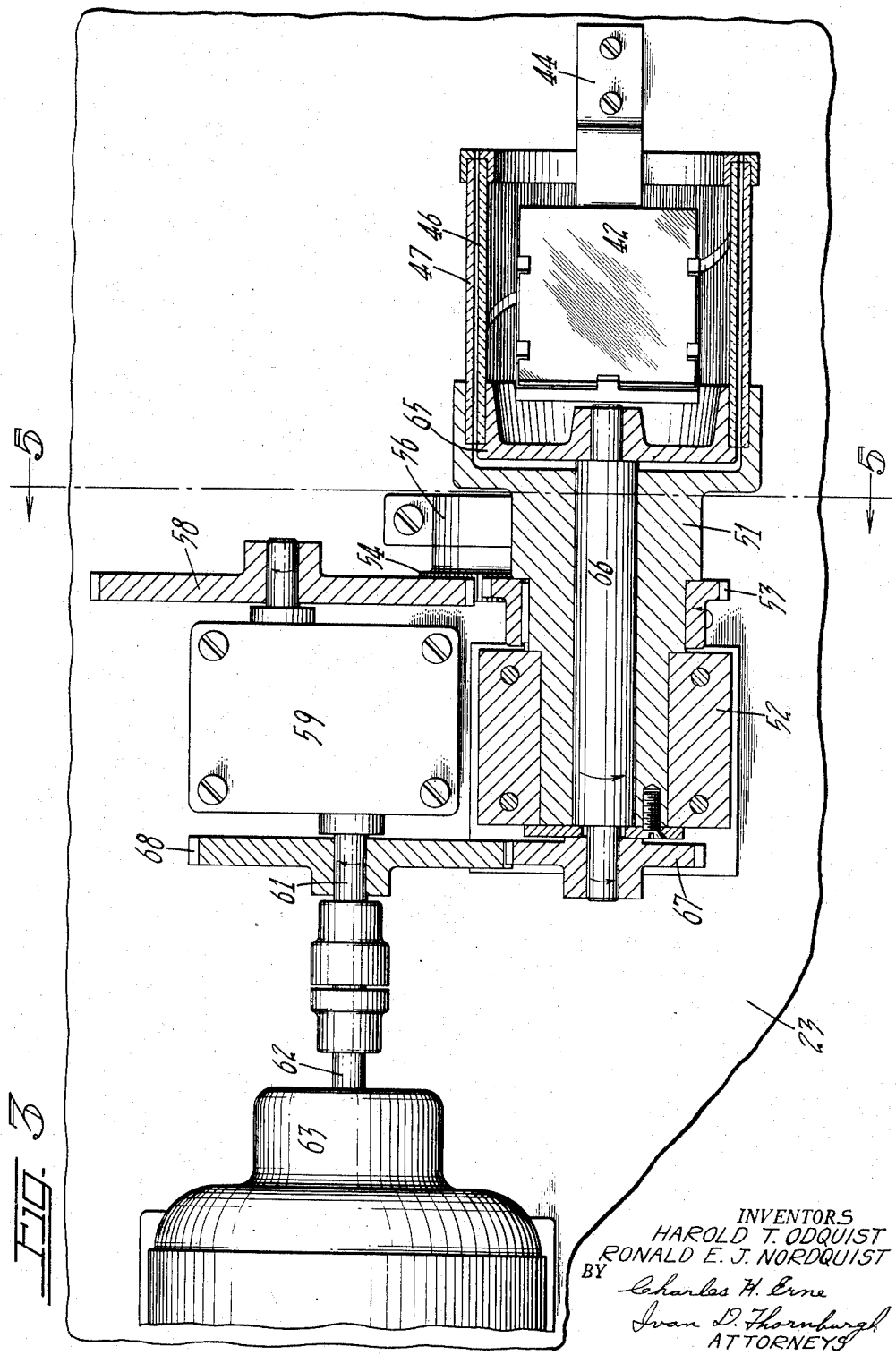

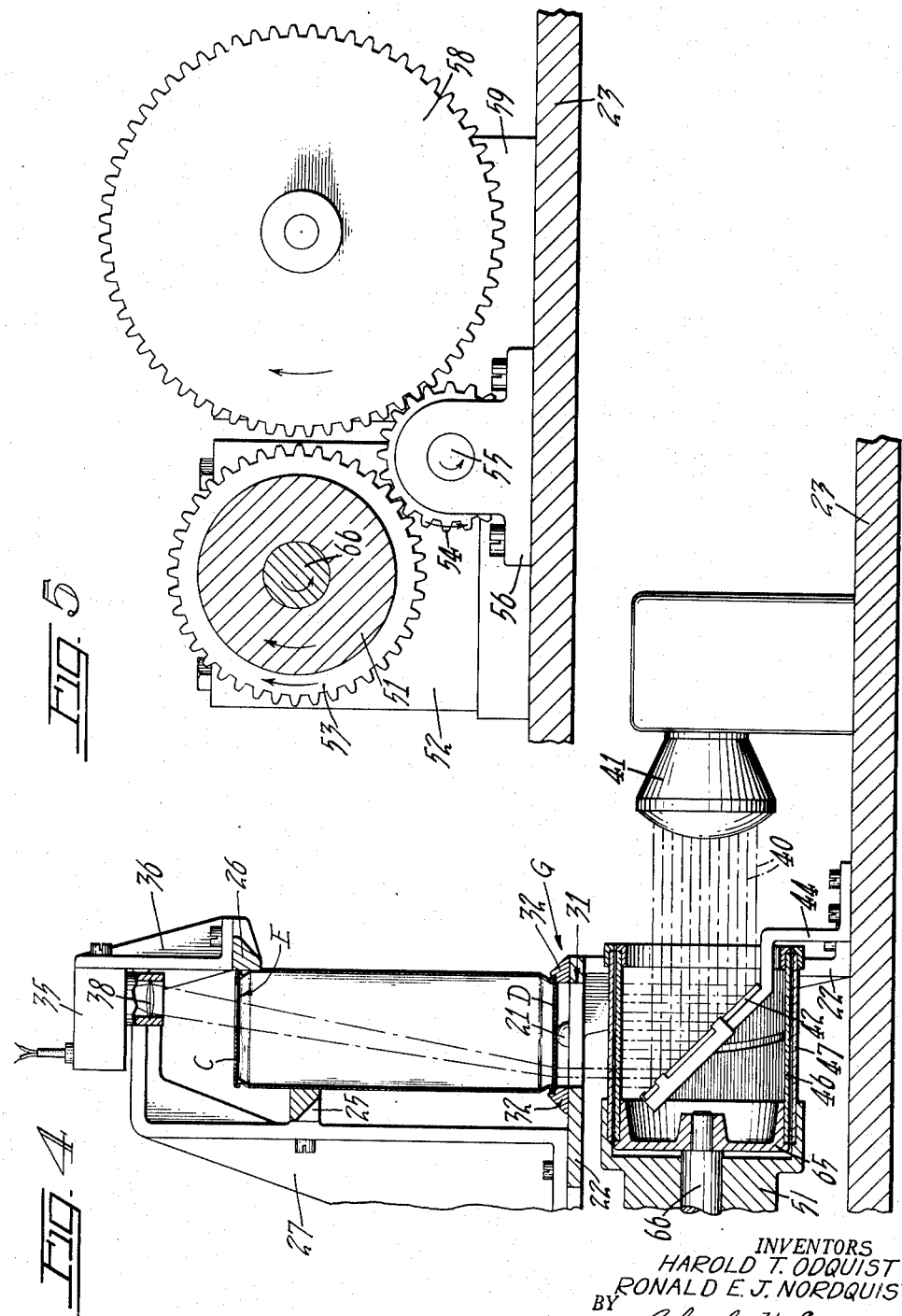

July 24, 1951 H. T. ODQUIST ET AL 2,561,406
APPARATUS FOR INSPECTING ARTICLES WITH A MOVABLE
SPOT OF RADIANT ENERGY
Filed Feb. 4, 1949 5 Sheets-Sheet 5

INVENTORS
HAROLD T. ODQUIST
RONALD E. J. NORDQUIST
BY
Charles H. Erne
Ivan D. Thornburgh
ATTORNEYS Patented July 24, 1951

2,561,406

UNITED STATES PATENT OFFICE 2,561,406

APPARATUS FOR INSPECTING ARTICLES WITH A MOVABLE SPOT OF RADIANT ENERGY

Harold T. Odquist, Yonkers, N. Y., and Ronald E. J. Nordquist, Maplewood, N. J., assignors to American Can Company, New York, N. Y., a corporation of New Jersey Application February 4, 1949, Serial No. 74,664

2 Claims. (Cl. 250—236)

The present invention relates to an apparatus for inspecting articles for foreign matter and the like in, on or about the articles and has particular reference to scanning or systematically and progressively projecting upon and moving in a plurality of directions across an area or body of an article, a spot of radiant energy for the detection of energy obstructive portions in the scanned area or body of the article.

An object of the invention is the provision of an apparatus for inspecting articles wherein a spot of radiant energy or light can be moved in any direction over an area or body of an article to successively expose small portions of the area or body for minutely examining the area or body point-by-point for foreign matter.

Another object is the provision of such an apparatus wherein the area of the spot of radiant energy or light may be proportioned to the dimensions of the foreign matter being sought so that very small particles of matter may be accurately detected.

Another object is the provision of such an apparatus wherein particles of foreign matter within translucent articles may be as readily detected as those on the exterior of opaque articles.

Numerous other objects and advantages of the invention will be apparent as it is better understood from the following description, which, taken in connection with the accompanying drawings, discloses a preferred embodiment thereof.

Referring to the drawings:

Figure 1 is a top plan view of an apparatus embodying the instant invention and for carrying out the method steps of the invention, with parts broken away and with an article in place for inspection;

Fig. 2 is a vertical section taken substantially along the broken line 2—2 in Fig. 1, with parts broken away;

Fig. 3 is an enlarged horizontal section taken substantially along the line 3—3 in Fig. 2, with parts broken away;

Fig. 4 is a vertical section taken substantially along the broken line 4—4 in Fig. 1, with parts broken away;

Fig. 5 is a vertical section taken substantially along the line 5—5 in Fig. 3, with parts broken away;

Figure 6:
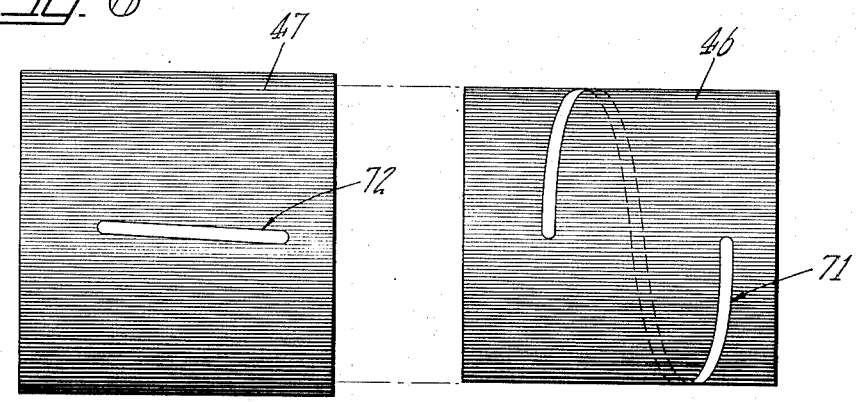
Fig. 6 is an elevational detail of two normally telescoping parts shown at the right in Fig. 3.

As a preferred and extremplary embodiment of the instant invention the drawings illustrate an apparatus for inspecting for foreign matter the interior surface of the bottom of a translucent fibre milk container A although the invention is equally well adapted to the inspection of other articles, whether translucent, transparent, or opaque, and whether flat or other shape, and to the inspection of liquids or solid products.

In the present apparatus for inspecting articles for foreign matter, radiant energy, preferably in the form of light beams, is reduced to a small spot which is systematically and progressively moved in a plurality of directions, upon and over a predetermined area of the article to be inspected until the entire area has been minutely examined point-by-point. The traveling spot of radiant energy emitted from the area being inspected is received in a radiant energy responsive device which detects any energy obstructive, interferring or diverting foreign matter in the scanned area of the article. The device in turn may be used to visibly indicate the presence of foreign matter or may be used to actuate other devices which will reject or eject any article bearing such foreign matter. During the inspecting operation the article preferably is held stationary although in some cases inspection may be effected while the article is moving. In the latter cases provision may be made to move the source of light and/or energy responsive device with the article so that no relative movement takes place between them.

The drawings illustrate one form of machine for carrying out these method steps. This machine is designed primarily to inspect the interior surface of the bottom of the exemplary translucent fibre milk container A hereinbefore mentioned. This container preferably is of the type disclosed in United States States Patent 2,085,979 issued July 6, 1937, to John M. Hothersall on Container. Such a container includes a paraffin coated, rectangular tubular fibre body B (Figs. 2 and 4) having top and bottom fibre members C, D respectively secured thereto in suitable end seams. The top member C is provided with a filling and dispensing opening E having a friction plug closure F hingedly secured thereto.

The containers A to be inspected enter the apparatus in an upright position with their bottoms resting on a horizontal slide rail 21 (Figs. 1, 2 and 4) and are brought to rest at an inspection station G. The slide rail 21 is secured to a table 22 which is bolted to a base plate 23. The containers are guided into the inspection station G by a pair of spaced and parallel guide rails 25, 26 which are secured to brackets 27 bolted to the table 22. Advancement of the container may be effected in any suitable manner.

At the inspection station G, a container A is located over and in vertical alignment with an inspection opening 31 formed in the table 22 so that the entire bottom member D of the container is exposed. At this station the container is supported on a pair of short spaced and parallel support rails 32 which engage under the end seam of the container and are thus out of the way of the container bottom to be inspected.

The friction plug closure F of the container is open and the filling and dispensing opening E is exposed when the container enters the inspection station G. At this station, the filling and dispensing opening E is located under and in vertical alignment with a radiant energy responsive device 35 which is secured to a bracket 36 bolted to the guide rail 26. The radiant energy responsive device 35 preferably includes a conventional electric eye 37 (Fig. 3) and an optical lens 38 (Fig. 4) interposed between the electric eye and the filling and dispensing opening E of the container A.

Inspection of the bottom area of the container A is effected by radiant energy in the form of a light beam 40 (Fig. 4) projected from a source of light 41 (Figs. 1, 2 and 4) mounted on the base plate 23. The light beam 40 is directed horizontally against an angularly disposed mirror 42 supported preferably at an angle of 45 degrees, on a bracket 44 secured to the base plate 23. The mirror reflects the light beam 40 upwardly toward the inspection opening 31 in the table 22 at the inspection station G.

During inspection of the container bottom D, a reduced area light beam is systematically and progressively selected from the mass of light of the beam 40 reflected from the mirror 42, to form or produce a small spot of light which is the only light which is projected against the container bottom. This spot of light is of proportions predetermined in relation to the dimensions of the particles of foreign matter being sought on the area of the container to be inspected. This selection of light beams and the dimensions of the spot of light projected against the container bottom is brought about by a pair of rotatable, telescoped, hollow cylinders which surround the mirror 42 and which comprise an inner scanning cylinder 46 (Figs. 3, 4 and 6) and an outer scanning cylinder 47, the axes of which are aligned with the source of light 41.

The scanning cylinders 46, 47 are disposed in a horizontal position and are preferably rotated in opposite directions, as indicated by the arrows in Fig. 3, although the cylinders may be rotated in the same direction if desired. For this purpose the outer cylinder 47 at one end is secured to a horizontally disposed sleeve 51 (Figs. 1, 2 and 3) which is journaled in a bearing 52 bolted to the base plate 23. The cylinder 47 is continuously rotated by a gear 53 which is keyed to the sleeve 51. The gear meshes with and is driven by an idler gear 54 (see Fig. 5) which is mounted on a short shaft 55 carried in a bearing block 56 bolted to the base plate 23. The idler gear 54 meshes with and is driven by a gear 58 of a conventional speed reduction unit 59 (Fig. 3) secured to the base plate. This unit is driven by a shaft 61 which is coupled or connected to a rotor shaft 62 of an electric motor 63 which constitutes the main source of driving power for the apparatus.

The inner scanning cylinder 46 is disposed within the outer cylinder 47 (Figs. 3, 4 and 6) and for this purpose it is slightly less in diameter than the inside diameter of the outer cylinder to provide a minimum clearance space. One end of the inner cylinder 46 is secured to a wheel 65 which is fixed on a horizontal shaft 66 extending through and journaled in the sleeve 51. The opposite end of the shaft 66 carries a driving gear 67 which meshes with and is driven by a gear 68 secured to the speed reduction unit driving shaft 61.

Hence when the motor 63 is in operation, it rotates the inner and outer cylinders 46, 47 in their proper directions and proper speeds. The speed of the inner cylinder 46 is greatly in excess of that of the outer cylinder 47, the ratio in the instant case being approximately 100 to 1.

The outer ends of the scanning cylinders 46, 47, i. e. the ends nearest the source of light 41 are open to permit the projection of the light beams 40 from the light source to the mirror 42. The beams reflected by the mirror are projected against the inner surface of the inner cylinder 46. These cylinders 46, 47 preferably are made of a transparent plastic material and except for sights 71, 72 respectively (Fig. 6) they have their exterior surfaces entirely masked with an opaque coating material. If desired, however, the cylinders may be made of any other material, the material may be opaque and the sights may be slots or other devices cut into the cylinders.

The sight 71 on the inner cylinder 46 preferably is a narrow helical band which extends entirely around the periphery of the cylinder as best shown in Fig. 6, the terminal ends of the band being longitudinally spaced apart a distance equal to the width or other desired dimension of the area of the container bottom to be inspected. The sight 72 on the outer cylinder 47 preferably is a narrow straight band extending longitudinally of the cylinder and at a slight angle to the axis of the cylinder so that one terminal end is circumferentially in advance of the opposite terminal end by a distance equal to the width of the band. The length of this straight sight 72 preferably is equal to the distance between the terminal ends of the helical sight 71 in the inner cylinder 46.

Figure 7:
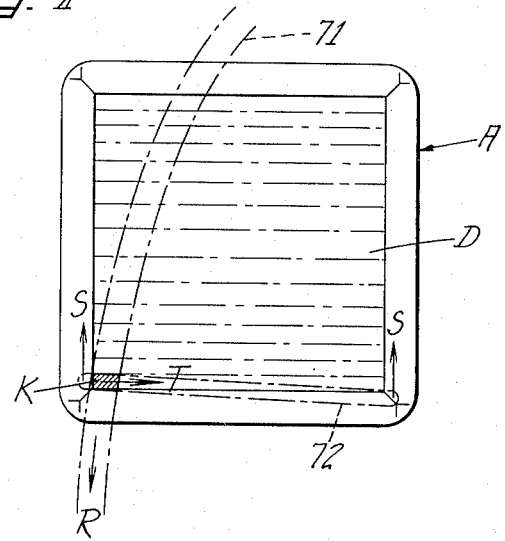
Fig. 7 is an enlarged schematic view of the bottom of an article to be inspected and the manner of scanning this area with a spot of radiant energy.

The particular shape and dimensions of the sights 71, 72 in the telescoped cylinders 46, 47 is arranged to effect a continuous intersection of the sights as diagrammatically shown in Fig. 7 and to thus block out all of the light beams 40 excepting those which register with the intersection of the two sights. In this manner the amount of light which is permitted to pass through the cylinders 46, 47 is confined to the area of the intersecting sights 71, 72 and it is this intersection of the sights that produces the spot of light hereinbefore mentioned and marked K in Fig. 7. The area of this spot of light is determined by the widths of the sights. By making these widths very narrow, a very small spot of light may be produced so that the area ratio between the spot of light and an infinitely small particle of foreign matter is sufficient to reduce the strength of the light beam or effective light radiating area and thus effect the operation of the electric eye in the radiant energy responsive device 35. Stated differently, the amount of light or radiant energy emitted by the area being scanned is reduced by any obstructing, interfering or diverting object or matter to cause a change in the energy output of the radiant energy responsive device.

As the outer scanning cylinder 47 rotates, it moves its longitudinal sight 72 across the bottom of the container A in the direction of the two arrows S, S as shown in Fig. 7. Each time the sight 72 advances a distance equal to its own width, the inner scanning cylinder 46 makes a complete revolution and hence its helical sight 71 crosses or intersects the longitudinal sight 72 of the outer scanning cylinder 47 in the direction of the arrow R in Fig. 7, and the spot of light produced by this intersection of the sights moves along the longitudinal sight 72 in the direction of the arrow T.

Hence every time the longitudinal sight 72 advances a distance equal to its own width, the spot of light travels the entire length of the sight and hence the spot of light while continuously moving forward or longitudinally across the bottom of the container A, is repeatedly and simultaneously moving transversely across the container bottom in a direction substantially at right angles to its forward travel. In this manner the entire bottom of the container is minutely scanned area by area or point-by-point while the container remains stationary.

In thus scanning the container bottom, the intersecting sights 71, 72 travel point-by-point over a predetermined area of the mirror 42 and thus systematically and progressively select a beam of light from the source of light 41 and project this selected beam against the bottom of the container. Since the container is coated with paraffin, it is translucent, and the traveling spot of light penetrates through the container bottom and is diffused in such a manner that it is picked up through container opening E, by the optical lens 38 and transmitted to the electric eye 37 of the radiant energy or light responsive device 35.

With the traveling spot of light reduced to a small area or point its effect upon the radiant energy responsive device 35 is supersensitive and hence the spot may be passed over the area to be inspected at a high rate of travel. It has been found that with such a machine the bottom of a container of the type mentioned above as an example may be inspected within a period of a few tenths of a second.

Figure 8:
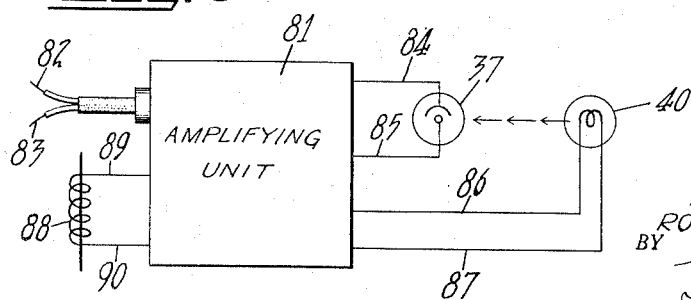
Fig. 8 is a wiring diagram of the electric parts used in the apparatus.

Reference should now be had to the wiring diagram shown in Fig. 8. A conventional amplifying unit 81 is used with the machine to amplify the electric current impulses from the electric eye 37 to visibly signal or electrically operate a reject mechanism for ejecting from the machine, containers found to contain foreign matter. The amplifying unit 81 receives electric current from any suitable source, by way of lead wires 82, 83 which connect with the unit. The electric eye 37 is connected to the unit by way of wires 84, 85. To provide a compact device the source of light 40 is also connected through the unit by wires 86, 87, to the lead wires 82, 83. Provision is also made for electrically operating a reject mechanism if such is desirable. For this purpose a solenoid relay 88 is connected into the unit by way of wires 89, 90.

It will be understood from the foregoing exemplary description that the present invention has a great many practical applications other than that disclosed herein.

It is thought that the invention and many of its attendant advantages will be understood from the foregoing description, and it will be apparent that various changes may be made in the form, construction, and arrangement of parts of the apparatus described herein, without departing from the spirit and scope of the invention or sacrificing all of its material advantages, the apparatus hereinbefore described being merely a preferred embodiment thereof.

We claim:

1. Apparatus for inspecting articles by passing radiant energy through a translucent wall thereof to detect the presence of foreign particles thereon, comprising means for supporting the article with its said wall in proximity to an inspection opening, a pair of opaque hollow scanning cylinders rotatably disposed in telescoping relation adjacent said opening, said cylinders respectively having a helical sight opening and a cooperating straight line sight opening disposed in registering relation in their peripheral surfaces, means for relatively rotating said cylinders to cause said sight openings to intersect in a spot sight movable in a continuous path of travel, means on the exterior of said cylinders for axially projecting a beam of radiant energy into the innermost cylinder, reflector means mounted within said innermost cylinder at an angle to the wall of said article for reflecting said beam through said spot sight and against said article wall as a spot beam for progressively scanning the entire wall surface along a plurality of straight and continuous parallel lines, and radiant energy responsive means disposed in the path of travel of and actuated by said moving spot beam for detecting the presence of energy obstructing foreign particles in the scanned wall area of said article.

2. Apparatus for inspecting translucent containers by passing a beam of light through a wall thereof to detect the presence of foreign particles on said wall, comprising means for supporting the container with its said wall in proximity to an inspection opening, a pair of opaque hollow scanning cylinders rotatably disposed in telescoping relation on the opposite side of said opening, the inner of said telescoped cylinders having a helical sight opening in its peripheral wall surface and the outer cylinder having a cooperating registering straight line sight opening in its peripheral wall surface, means for relatively and differentially rotating said cylinders to cause their said registering sight openings to intersect in a spot sight movable in a continuous path of travel adjacent said inspection opening, a fixed light source disposed exteriorly and axially of said cylinders for projecting a beam of light into the innermost cylinder in a direction axially thereof, a mirror fixedly mounted within said innermost cylinder at an angle to its peripheral wall surface and to said container wall for intercepting and reflecting said light beam as a spot beam through said spot sight and against said container wall for progressively scanning the entire wall surface along a plurality of straight and continuous parallel lines, and photo-electric means disposed in the path of travel of and actuated by said moving spot beam of light for detecting the presence of minute light beam obstructing foreign particles in the scanned wall area of said container.

HAROLD T. ODQUIST.
RONALD E. J. NORDQUIST.

(References on following page)

REFERENCES CITED

The following references are of record in the file of this patent:

UNITED STATES PATENTS

| Number | Name | Date |
|---|---|---|
| 1,546,193 | Bissiri | July 14, 1925 |
| 1,859,597 | Nason | May 24, 1932 |
| 1,859,828 | Jenkins | May 24, 1932 |
| 2,184,159 | Stockbarger | Dec. 19, 1939 |
| 2,454,411 | Stoate | Nov. 23, 1948 |
| 2,454,412 | Stoate | Nov. 23, 1948 |

FOREIGN PATENTS

| Number | Country | Date |
|---|---|---|
| 517,229 | Great Britain | Jan. 24, 1940 |